R. K. Kille,

Slate Roofing.

No. 3701. Reissued Nov. 2. 1869.

Witnesses.
Samuel Smith
Jay Hyatt

Inventor
Robert K. Kille
by Alex. A. L. Klauckke
Attorneys.

United States Patent Office.

ROBERT K. KILLE, OF MOUNT HOLLY, NEW JERSEY.

*Letters Patent No.* 94,689, *dated September* 7, 1869; *reissue No.* 3,701, *dated November* 2, 1869.

IMPROVED ROOFING.

The Schedule referred to in these Letters Patent and making part of the same.

*To all whom it may concern:*

Be it known that I, ROBERT K. KILLE, of the town of Mount Holly, county of Burlington, State of New Jersey, have invented certain new and useful Improvements in Roofing; and I do hereby declare the following to be a full, clear, and exact description thereof, reference being had to the accompanying drawings.

In the construction of slate or shingle roofs it has been found necessary to overlap the pieces of slate or shingle, so as to leave only about one-third of their surface exposed to the weather, in order to prevent leakage at the joints.

Slate roofs have also been made by laying the slate on a bed of mortar or cement, first applied to the sheathing.

~~In the latter case, when the slate or equivalent~~ outer covering is laid flat, with the edges thereof in contact with each other, there is a greater liability of the cement cracking at the joint where protection is most required, than at any other point.

It has also been found quite difficult to obtain a mortar or cement that is absolutely water-proof, or that will remain so, for the length of time required for a roof.

It has, therefore, been the practice in the construction of cement or slate roofs to overlap the slate to the usual extent, as before described, to insure a tight joint.

The object of my invention is to prevent the cracking of the cement at the joints, and to protect the latter from the action of the weather, and to avoid the great waste of material which results from the extent of the overlapping of the slate, as above described.

The nature of my invention consists in applying to the slate or shingle, strips of metal, or other thin water-proof material, so as to break joints therewith, said strips being laid above or beneath a mortar, cement, or other coating or bed, interposed between the sheathing and outer covering, as may be preferred.

In the accompanying drawings—

Figure 1:
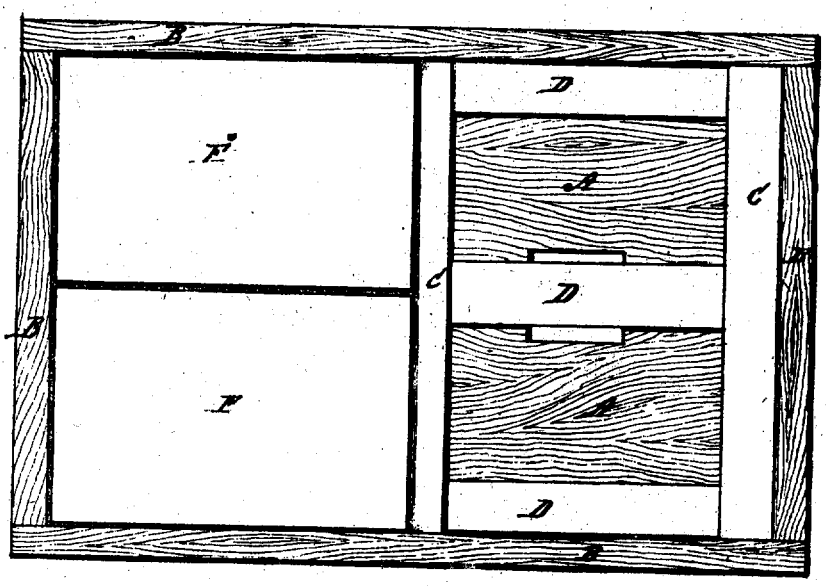

Figure 1 is a top view of a section of roofing, one-half being completed, and the other only partially finished.

Figure 2:
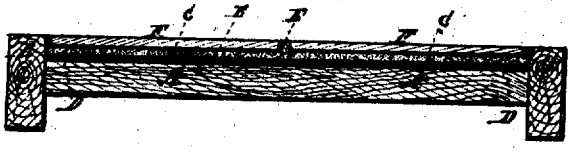

Figure 2, a section at the line *x x*, fig. 1.

To enable others skilled in the art to make and use my improved roofing, I will proceed to describe the same more fully, similar letters of reference denoting like parts.

A represents the sheathing, which is laid upon the rafters in the usual manner:

B B, &c., a beading around the edge of the roof, which projects upwardly a distance equal to the estimated thickness of the roofing;

C C C are strips of tin or other suitable water-proof material, which are represented in the drawings as laid directly on top of the sheathing, and longitudinally of the same, at intervals or distances apart nearly equal to the width of the slates which are used;

D D are similar strips, which are laid crosswise of the roof, and at right angles to the strips C, these strips D being apart a distance not quite equal to the length of the slates;

E is intended to represent a composition cement, the process of making which will be hereinafter described; and ~~F F represent the slates~~

The wood roof being prepared, the strips of metal are laid, as described, so as to break joints with the slates, and the composition is then put on over the whole surface, covering the wooden sheathing and the metal strips, to any desired depth.

Instead of arranging the strips underneath the cement or mortar covering, it is evident that they may be arranged on top thereof with the same or like effect.

The pieces of slate are then laid on and embedded in the cement, the pieces simply touching at their edges or slightly overlapping, from one to two inches, as may be preferred.

I have discovered that the best cement to be used is produced in the following manner:

I take one bushel of lime, slaked, to which I add three bushels of sand, one-half bushel of coal-dust, twelve gallons of water, and half a gallon of molasses. These I mix together to about the consistency of mortar, and apply in that state to the roof.

The function performed by my arrangement of the strips D, in protecting the joints of the slate, is of a two-fold character.

First, it subjects the cement beneath the strips to a greater pressure, which renders the cement thereunder less liable to crack than at other points removed from the joints, and more immediately under the slate, where the cracking is not attended with such injurious consequences.

Secondly, it protects the joints by the water-proof character of the strips themselves, which are arranged to break joints thereunder.

By the use of my improvement, I am thus enabled to construct a roof with only about two-fifths of the slate heretofore required.

The roof can be laid at a much less cost than any of the most approved roofs now in use, as it requires less labor, and may be done without the employment of highly-skilled labor; the same degree of care only being necessary as is observed in the laying of foot-pavements.

What I claim as my invention, is—

The strips D, arranged with the coating or cement E and the slate or other equivalent outer covering, so as to break joints thereunder, substantially in the manner set forth.

In testimony whereof, I have hereunto set my hand, this 20th day of October, 1869.

ROBT. K. KILLE.

Witnesses:

HENRY A. JOHNSTON,
E. R. BROWN.